(12) United States Patent
Petrides

(10) Patent No.: US 7,894,520 B2
(45) Date of Patent: Feb. 22, 2011

(54) APPARATUS AND METHOD FOR GENERATING PATTERNS OF FORWARD AND BACKWARD VECTORS FOR FRAME CONVERSION

(75) Inventor: Gordon Petrides, San Jose, CA (US)

(73) Assignee: Tamiras Per Pte. Ltd., LLC, Dover, DE (US)

( * ) Notice: Subject to any disclaimer, the term of this patent is extended or adjusted under 35 U.S.C. 154(b) by 1195 days.

(21) Appl. No.: 10/979,948

(22) Filed: Nov. 1, 2004

(65) Prior Publication Data

US 2005/0134729 A1 Jun. 23, 2005

Related U.S. Application Data

(60) Provisional application No. 60/532,436, filed on Dec. 23, 2003.

(51) Int. Cl.
*H04N 7/12* (2006.01)
(52) U.S. Cl. .................. 375/240.02; 375/240.03
(58) Field of Classification Search ............ 375/240.02, 375/240.25
See application file for complete search history.

(56) References Cited

U.S. PATENT DOCUMENTS

| | | | | |
|---|---|---|---|---|
| 5,598,217 | A * | 1/1997 | Yamaguchi | 375/240.21 |
| 5,883,613 | A * | 3/1999 | Iwaki | 345/681 |
| 6,151,075 | A * | 11/2000 | Shin et al. | 348/459 |
| 6,240,211 | B1 * | 5/2001 | Mancuso et al. | 382/236 |
| 6,466,618 | B1 * | 10/2002 | Messing et al. | 375/240.01 |
| 6,658,056 | B1 * | 12/2003 | Duruoz et al. | 375/240 |
| 7,116,372 | B2 * | 10/2006 | Kondo et al. | 348/448 |
| 7,242,370 | B2 * | 7/2007 | Ouchi et al. | 345/1.3 |
| 7,333,545 | B2 * | 2/2008 | Duruoz et al. | 375/240.25 |
| 7,349,029 | B1 * | 3/2008 | Chou | 348/448 |
| 2001/0033340 | A1 * | 10/2001 | Yui | 348/592 |

OTHER PUBLICATIONS

"*Frame Rate*", Definition from http://www.atis.org/tg2k/_frame_rate.html., 1 Page, downloaded Feb. 16, 2004.
"*Frame-Rate Conversion*", Definition from http://www.atis.org/tg2k/_frame-rate_conversion.html., 1 Page, downloaded Feb. 16, 2004.
"*Reversing Motion Vector Fields*" Susie J. Wee, IEEE International Conference on Image Processing, Chicago, IL, Oct. 1998, downloaded from http://www.hpl.hp.com/personal/Susie_Wee/PAPERS/icip98.ps, 2 Pages, downloaded Feb. 16, 2004.
"*OL _Motion Motion Processor*" Rev 1.0, Ocean Logic Pty Ltd., 6 Pages.
"*How Video Formatting Works*", downloaded from http://entertainment.howstuffworks.com/video-format.htm/printable, 8 Pages, downloaded on Feb. 16, 2004.
"An Explanation of Film-to-Video Frame Rate Conversion for NTSC", downloaded from http://www.avdeals.com/classroom/proscanexplained.htm, 7 Pages, downloaded on Nov. 1, 2004.

* cited by examiner

*Primary Examiner*—Tung Vo
*Assistant Examiner*—Anner Holder
(74) *Attorney, Agent, or Firm*—Christensen O'Connor Johnson Kindness PLLC

(57) ABSTRACT

The computing forward and backward vectors in unique patterns to achieve improved horizontal and vertical detail of the video display while reducing data processing and storage overhead is disclosed. The invention comprises generating a unique pattern of forward and backward motion vectors. The motion vectors are calculated using a quincunx vector sub-sampling of the forward and backward motion vectors to generate the pattern of motion vectors. The unique pattern generated by the quincunx vector sub-sampling provides more symmetrical sampling in the horizontal, vertical and diagonal directions and the benefit of lower data processing overhead while performing frame rate conversion.

9 Claims, 3 Drawing Sheets

PRIOR ART

PRIOR ART

PRIOR ART

APPARATUS AND METHOD FOR GENERATING PATTERNS OF FORWARD AND BACKWARD VECTORS FOR FRAME CONVERSION

RELATED APPLICATIONS

The present application claims priority from U.S. Provisional Application Ser. No. 60/532,436 entitled "Quincux Forward and Backward Vector Interleave", filed on Dec. 23, 2003, by Gordon Petrides, assigned to the assignee of the present invention, and incorporated by reference herein for all purposes.

FIELD OF THE INVENTION

The present invention relates generally to the video display devices, and more particularly, to an apparatus and method for computing forward and backward vectors in unique patterns to achieve improved horizontal and vertical detail of the video display while reducing data processing and storage overhead.

BACKGROUND OF THE INVENTION

Feature films are projected at a rate of 24 frames per second. The process of projecting 24 still pictures every second creates the illusion of continuous motion on the screen. In contrast, video formats were designed for cathode ray tube television sets, which work in a completely different manner than film projectors. Televisions create still pictures, line by line, with an electron beam that passes over a phosphor coated screen. When television was first developed, the National Television Standards Committee (NTSC) defined a standard having 480 lines of resolution. In other words, the electron beam was passed over the phosphorous screen from left to right in 480 rows, from top to bottom, of the screen. When televisions were first developed, it was not feasible for the electron bream to scan all 480 rows in a single frame. As a consequence, televisions were initially designed to perform interlacing. With interlacing, every other row is scanned in a first frame and the skipped rows are scanned in the next frame. More recently progressive scan televisions have been developed, which enable all 480 lines to be scanned in each frame. Now with high definition television or "HDTV", new resolution formats have been developed, such as SMPTE 274M-1995 (1920×1080 resolution) SMPTE 296M-1997 (1280× 780 resolution), etc. Regardless of the video resolution used, the frame rate differs than that used by feature films.

Since video and film have different frame rates, a frame rate conversion must be performed before a feature film can be played on a video display. For example with the NTSC format, 30 frames or 60 fields are displayed per second. Thus if only two film frames are recorded for every five frames of video, a video copy of the movie can be created that plays at the correct speed.

With video displays, area flicker is an artifact that becomes visible if the image is not refreshed fast enough. This is particularly irritating with larger displays as the eye is more sensitive to flicker in the peripheral visual regions. To reduce flicker, the display needs to refreshed at a faster rate. A straight forward scheme for up conversion that repeats the same frame more than once is therefore useful for reducing flicker. For example, a conversion from 24 frames per second to 72 frames per second has generally been found to reduce the flicker problem. Unfortunately, the higher frame rate introduces another artifact called "motion judder" when the motion of an object is present in the film.

Motion vectoring is a technique used to alleviate motion judder. With motion vectoring, frames are constructed or predicted from a reference frame using motion vectors and a prediction error. The reference frame can either be unidirectional or bidirectional. With unidirectional motion prediction schemes, the predicted picture frame is constructed from a previous reference picture frame using a motion vector and a prediction error. The reference picture frame is typically a previous frame that has been compressed using an intra-frame coding technique. With bidirectional schemes, the predicted frame is constructed from the best matching of either a previous or a future picture frame using either forward or backward motion vectors and a prediction error.

The use of forward and backward motion vectors is problematic for a number of reasons. At the trailing edge of a moving object for example, the newly uncovered area does not have a match in the previous frame. As a result, forward vectors can be computed while backward vectors cannot. At the leading edge of the moving object, previously visible areas are now obscured. Forward vectors can therefore be computed while backward vectors cannot. It would therefore be ideal to compute both forward and backward vectors. Computing both forward and backward vectors, however, is extremely computation intensive and requires a significant amount of data storage.

An apparatus and method for computing forward and backward vectors in patterns to achieve improved horizontal and vertical detail of the video display while reducing data processing and storage overhead.

SUMMARY OF INVENTION

To achieve the foregoing, and in accordance with the purpose of the present invention, the computing forward and backward vectors in patterns to achieve improved horizontal and vertical detail of the video display while reducing data processing and storage overhead is disclosed. The invention comprises generating a unique pattern of forward and backward motion vectors. The motion vectors are calculated using a quincunx vector sub-sampling of the forward and backward motion vectors to generate the pattern of motion vectors. The unique pattern generated by the quincunx vector sub-sampling provides finer horizontal and vertical detail and the benefit of lower data processing overhead while performing frame rate conversion.

BRIEF DESCRIPTION OF THE DRAWINGS

The invention, together with further advantages thereof, may best be understood by reference to the following description taken in conjunction with the accompanying drawings in which:

FIG. 2 is a full resolution pattern of forward and backward motion vectors.

FIG. 3 is a vertically aligned interleaved pattern of forward and backward motion vectors.

FIG. 4 is a horizontally aligned interleaved pattern of forward and backward motion vectors.

FIG. 5 is a non-coincident pattern of forward and backward motion vectors generated by quincunx sub-sampling according to the present invention.

FIG. 6 is a coincident pattern of forward and backward motion vectors generated by quincunx sub-sampling according to the present invention.

In the figures, like reference numbers refer to like components and elements.

DETAILED DESCRIPTION OF THE INVENTION

Figure 1:
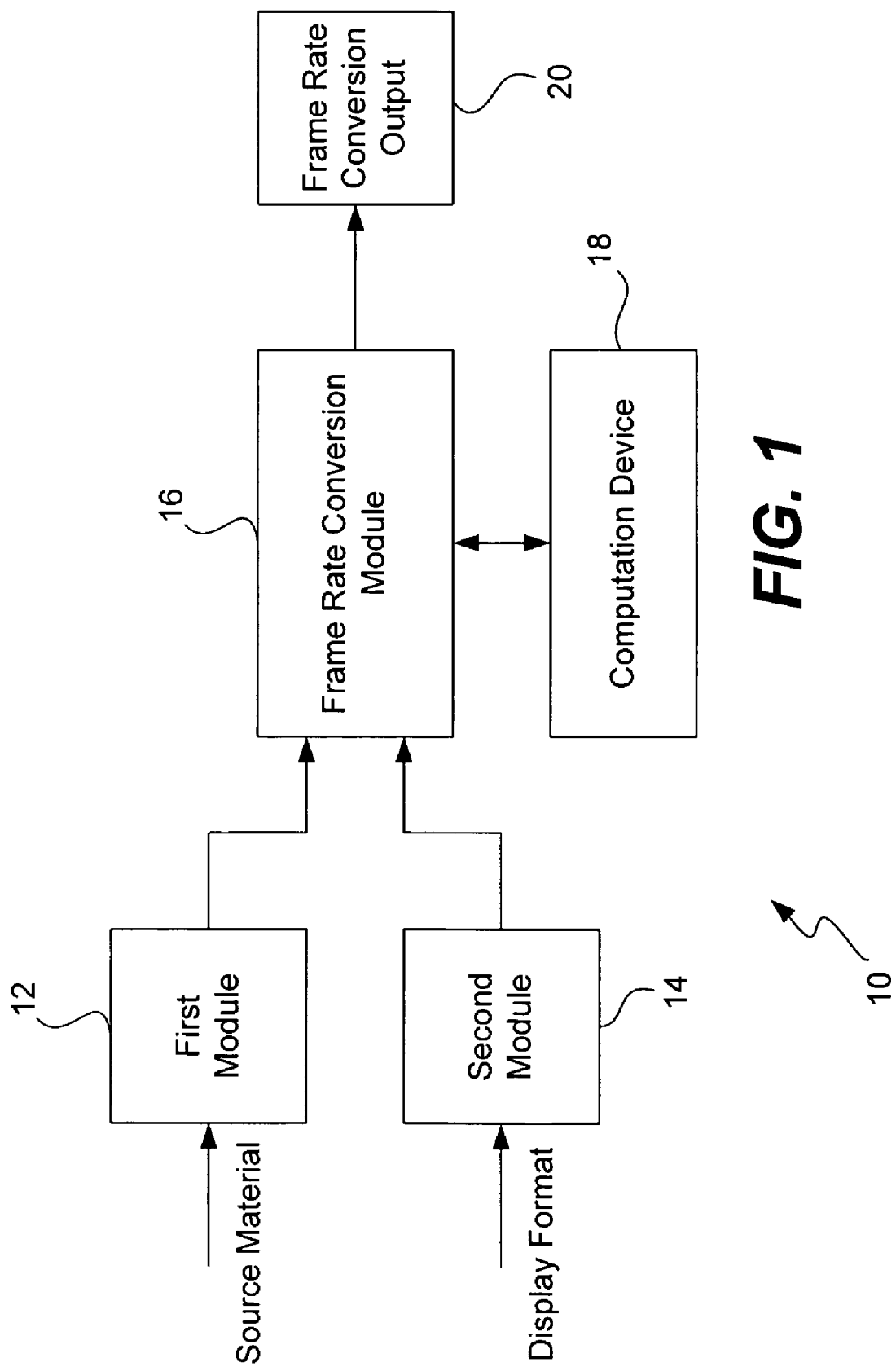
FIG. 1 is a block diagram of a frame rate conversion system according to the present invention.

Referring to FIG. 1, a block diagram of a frame rate conversion system according to the present invention is shown. The frame rate conversion system 10 includes a first module 12 configured to ascertain the frame rate of a source of material and a second module 14 that ascertains the display rate of the display. The frame rate conversion system 10 also includes a frame rate conversion module 16 that is responsible for performing a frame rate conversion of the source material to the frame rate required or preferred by the display device. A computation device 18, coupled to the frame rate conversion device 16, is used to perform a quincunx vector sub-sampling of forward and backward motion vectors to generate a pattern of motion vectors. The pattern of motion vectors are used by the frame rate conversion module 16 to generate intermediate frames in the frame rate conversion. More specifically, the frame rate conversion module 16 uses the pattern of motion vectors to generate either a previous or a future picture frame using the quincunx pattern of forward or backward vectors and a prediction error. According to various embodiments of the invention, the forward and backward motion vectors are generated using any one of a number of well known algorithms such as block matching or phase correlation.

In one embodiment of the invention, the term quincunx broadly means the arrangement of motion vectors in a pattern array having four sides and a center. In other words, the vectors are organized into five sets or groups. The first four sets make up the four sides of the patterned array. The fifth group is generally located in the middle of the array pattern.

In contrast, prior art motion vectors are arranged in a number of non-quincunx patterns. For example, FIG. 2 shows a full resolution pattern of forward and backward motion vectors. The forward vectors, designated by the letter "f", are arranged in a first patterned array. The backward vectors, designated by the letter "b", are arranged in a second patterned array of vectors. FIG. 3 shows a vertically aligned interleaved pattern of forward and backward motion vectors. FIG. 4 is a horizontally aligned interleaved pattern of forward and backward motion vectors. The problem with each of these patterns is the ratio of the maximum distance between forward (or backward) samples in FIGS. 3 and 4 to the distance between forward (or backward) samples in FIG. 5 is $2/\sqrt{2}$. This means that the effective sampling rate is improved by this ratio without increasing the computation rate.

The arranging the forward and reverse motion vectors in a quincunx pattern on the other hand offers a number of advantages. Specifically, it provides finer horizontal and vertical detail while requiring less data processing and storage. The ratio of the maximum distance between forward (or backward) samples in FIGS. 3 & 4 to the distance between forward (or backward) samples in FIG. 5 is 2/(square root 2). This means the effective sampling rate is improved by this ratio without increasing the computation rate. Quincunx sampling offers a more symmetrical sampling pattern in a two dimensional space where distances between samples are matched in horizontal, vertical and diagonal directions.

Referring to FIG. 5, a non-coincident pattern of forward and backward motion vectors generated by a quincunx sub-sampling according to the present invention is shown. In this embodiment, the forward "f" and backward "b" vectors are arranged in a non-coincident arrangement, meaning the spatial coordinates of the formation of forward and backward vector samples do not coincide, rather they are interleaved. The four sides of the array interleave the forward and backward vectors in an alternating pattern of "f" and "b" vectors.

Referring to FIG. 6, a coincident pattern of forward and backward motion vectors generated by quincunx sub-sampling according to another embodiment of the present invention is shown. As used herein, the term coincident pattern means spatial coordinates of the forward and backward vector samples which coincide, and are not interleaved. In this example, the calculating of intermediate frames using quincunx vector sub-sampling further comprises organizing the forward vectors in a first sub-array and the backward vectors in a second sub-array.

Figure 7:
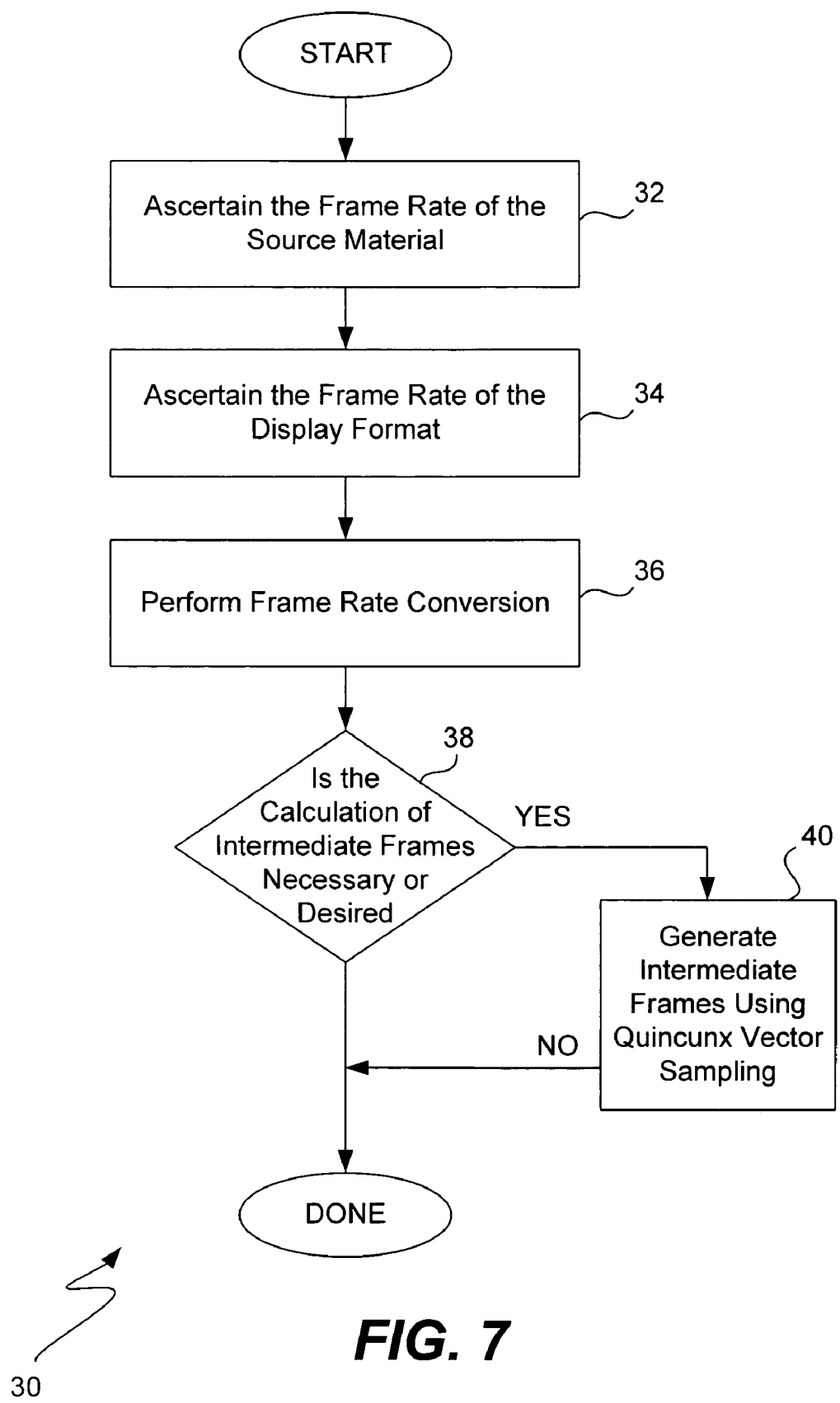
FIG. 7 is a flow diagram illustrating the sequence of the present invention.

FIG. 7 is a flow diagram 30 illustrating the frame rate conversion sequence of the present invention. In a first step, the frame rate of the source material is ascertained using the first module 12 (box 32). The frame rate of the display format is next ascertained by module 14 (box 34). A frame rate conversion is then performed (box 36). Based on the frame rate conversion, it is determined if the generation of intermediate frames is necessary or desired (decision diamond 38). If no, then the sequence is complete. If yes, then the intermediate frames are generated using quincunx vector sub-sampling as described herein (box 40).

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of operating a frame rate conversion system including a computation device to perform a frame rate conversion, the method comprising:

ascertaining a frame rate of a source material;

ascertaining a frame rate of a display format;

performing a frame rate conversion of the source material into the frame rate of the display format to calculate at least one intermediate frame; and providing for display both frames of the source material and the at least one intermediate frame;

wherein said performing a frame rate conversion includes:

arranging forward-motion vectors and backward-motion vectors in an alternating interleaving pattern such that a ratio of a maximum distance between two vertically or horizontally adjacent forward samples of the motion vectors and a distance between two diagonally adjacent forward samples of the motion vectors is two divided by the square root of two, wherein a horizontal and vertical distance between two adjacent samples of the forward- and backward-motion vectors is one; and calculating an intermediate frame using the alternating interleaving pattern;

wherein a total number of forward-motion and backward-motion vectors in the alternating interleaving pattern is the same as a full-resolution forward-only or backward-only vector scheme; and wherein the alternating interleaving pattern provides a higher vector resolution for a specified direction than would a horizontal-only interleaving or a vertical-only interleaving pattern.

2. The method of claim 1, wherein said calculating an intermediate frame comprises sub-sampling with non-coincident forward-motion and backward-motion vectors such that spatial coordinates of the forward-motion and backward-motion vectors do not coincide.

3. The method of claim 1, wherein said calculating an intermediate frame further includes arranging forward-motion and backward-motion vectors in a non-coincident arrangement.

4. The method of claim 1, wherein said calculating an intermediate frame comprises organizing the forward-motion vectors in a first sub-array and the backward-motion vectors in a second sub-array.

5. The method of claim 4, wherein the first sub-array and the second sub-array are co-sided with respect to one another.

6. A method of generating a pattern of forward-motion and backward-motion vectors with a frame rate conversion system including a computation device, the method comprising:
arranging forward-motion vectors and backward-motion vectors in an alternating interleaving pattern such that a ratio of a maximum distance between two horizontally or vertically adjacent forward samples of the motion vectors and a distance between two diagonally adjacent forward samples of the motion vectors is two divided by the square root of two, wherein a distance between two horizontally or vertically adjacent samples of the forward- and backward-motion vectors is one; and
calculating an intermediate frame using the alternating interleaving pattern;
wherein the total number of forward-motion and backward-motion vectors in the alternating interleaving pattern is the same as in a full-resolution forward-only or backward-only vector scheme.

7. The method of claim 6, wherein said arranging forward-motion vectors and backward-motion vectors includes:
performing a frame rate conversion of a source material to a display format; and
using the alternating interleaving pattern of forward-motion and backward-motion vectors to generate the intermediate frame during the frame rate conversion.

8. A frame rate conversion system, comprising:
one or more modules configured to ascertain a frame rate of a source material and a frame rate of a display;
a computation device configured to perform quincunx sub-sampling of a previous frame and a subsequent frame in the source material and arrange backward-motion vectors from the previous frame and forward-motion vectors from the subsequent frame in an alternating interleaving pattern such that ratio of a maximum distance between two vertically or horizontally adjacent forward samples of the motion vectors and a distance between two diagonally adjacent forward samples of the motion vectors is two divided by the square root of two, wherein a horizontal and vertical distance between two adjacent samples of the forward-motion and backward-motion vectors is one;
a frame conversion module configured to:
receive the forward-motion vectors and backward-motion vectors in the alternating interleaving pattern from the computation device; and
use the backward-motion vectors and forward-motion vectors in the alternating interleaving pattern and a prediction error to generate an intermediate frame that is between the previous and subsequent frames;
wherein a total number of forward-motion vectors and backward-motion vectors in the alternating interleaving pattern is the same as in a forward-only vector scheme or backward-only vector scheme; and
a display configured to display the previous, intermediate, and subsequent frames.

9. The frame rate conversion system of claim 8, wherein to arrange the backward-motion vectors from the previous frame and the forward-motion vectors from the subsequent frame, the computation device is further configured to organize the forward-motion vectors in a first sub-array and the backward-motion vectors in a second sub-array.

* * * * *

UNITED STATES PATENT AND TRADEMARK OFFICE
CERTIFICATE OF CORRECTION

| | | |
|---|---|---|
| PATENT NO. | : 7,894,520 B2 | Page 1 of 1 |
| APPLICATION NO. | : 10/979948 | |
| DATED | : February 22, 2011 | |
| INVENTOR(S) | : Petrides | |

It is certified that error appears in the above-identified patent and that said Letters Patent is hereby corrected as shown below:

Column 6, line 12, in Claim 8, delete "ratio" and insert -- a ratio --.

Signed and Sealed this
Fifth Day of July, 2011

David J. Kappos
*Director of the United States Patent and Trademark Office*